Patented May 10, 1938

2,117,158

UNITED STATES PATENT OFFICE 2,117,158

METHOD OF EXTERMINATING CORN BEETLES AND OTHER VERMIN

Werner Freyberg and Walter Haupt, Delitzsch/ Sachsen, Germany, assignors to Ernst Freyberg Chemische Fabrik Delitia, Delitzsch/Sachsen, Germany No Drawing. Application October 16, 1935, Serial No. 45,368. In Germany November 6, 1934

7 Claims. (Cl. 99—225)

This invention relates to the extermination of corn beetles and other vermin.

The damage caused by the corn beetle to grain stored in the granary is only too well-known to the persons concerned. The annual value of the grain which is destroyed by corn beetles is estimated to amount to about 100,000,000 reichsmark for Germany alone. In spite of the extreme importance of the problem of exterminating corn beetles and like vermin, no one has yet succeeded in discovering an absolutely reliable means for eradicating these and other pests from grain and other seeds. Sprays must, of course, be excluded from the start for this purpose as the grain stored in the granary would be much damaged if these were used. Gassing the granaries with poisonous gases appeared to offer the greatest prospects of success but the noteworthy fact was discovered that the corn beetle has a relatively high power of resistance even to hydrocyanic acid, so that even this extremely poisonous gas, the use of which moreover is associated with much inconvenience and danger, cannot be said to be absolutely certain in its action. Thus, for example, it is stated in a leaflet of the Biologische Reichsanstalt of Berlin-Dahlem issued in June 1934, that "Absolutely reliable and thoroughly effective gassing means for checking the corn beetle have not yet been found up to the present time."

It is therefore an object of the present invention to provide new methods of exterminating corn beetles and other vermin in grain.

It is another object of the invention to provide a method for eradicating corn beetles and other harmful vermin, as well as their larvae, from stored grain and other seeds.

It is a further object of the present invention to provide methods of developing phosphine in granaries in concentrations sufficient to kill corn beetles and their larvae.

It is also an object of the invention to provide methods of evolving phosphine from calcium phosphide and other similar phosphides without danger of self-ignition.

It is finally an object of the present invention to provide a method for gassing stored grain without using gas tight chambers.

Other objects and advantages of the invention will appear from the following description.

The poisonous action of phosphine on corn beetles and other vermin is in itself well known. Nevertheless, it has not previously been possible in practice to use this gas in granaries and the like. Naturally, granaries which are practically never gas-tight cannot be filled with large quantities of phosphine since, apart from the large quantity of phosphine which would be necessary, the danger associated with its use would exclude the practical employment of such a process.

It has now been unexpectedly found that the development of phosphine in a concentration which is fatal to corn beetles and other vermin can be successfully obtained by placing solid substances which evolve phosphine in the immediate neighbourhood of the grain, that is between or close beside or on or in the heaps of grain which are attacked by the corn beetles.

As the solid substances which develop phosphine, all possible phosphides, such as calcium phosphide, barium phosphide, aluminium phosphide, magnesium phosphide and so forth are suitable for being used. These substances when they are introduced in a suitable packing into the stored grain gradually give off phosphine in continuously increasing amount owing to the moisture contained in the grain. The evolution of gas is still further promoted owing to the fact that grain which has been attacked by corn beetles generally contains a higher percentage of moisture and is also of a slightly higher temperature than sound grain. It is particularly important that the phosphine should be evolved gradually when the new process is employed. On the one hand, the danger of self-ignition which might be present if a large quantity of phosphine were suddenly evolved is obviated with certainty. On the other hand, it is just this slow action of a gradually increasing concentration of poisonous gas which appears to effect the killing of the corn beetles with absolute certainty, whereas the sudden action of large quantities of the poisonous gas appears to put the vermin into a state in which they are insensitive to further quantities of the gas, without, however, being completely killed.

In order to prevent as far as possible the escape of the poisonous gas into the neighbouring atmosphere and to ensure a gradual increase of the concentration of the gas in the heaps of grain which are attacked by the vermin, it is advisable to cover the grain with sacks, tarpaulins, paper or the like during the treatment.

It has been found that with this treatment the corn beetles and other harmful insects, as well as their larvae, which may be contained in the grain are killed, although, if the dosage of the compound which evolves the phosphine be correct, after 4 to 8 days hardly any smell of phosphine can be noticed in the granary, so that the granary can then be entered as usual without danger and the residue of the vermin exterminating agent can then be removed from the grain. The dead corn beetles and other insects can be separated from the grain in known manner, for example by winnowing whereby the grain simultaneously becomes aerated and the last traces of any odour of phosphine which may adhere to it are eliminated.

In order to introduce into the heap of grain the compound which evolves phosphine, the compound must be packed in a suitable gas-pervious packing. It has been found advantageous for this purpose to wrap the phosphide in a dry bag made of paper, fabric or metal gauze which itself is contained in a case which is made of sheet metal, artificial material, porcelain or the like and is perforated and is again inserted in a second bag made of gauze. This packing is preferably provided with a thread to which a coloured tab is attached so as to enable the bag to be easily found in the heap of grain after the gassing has been completed.

When used in practice the new process is extremely inexpensive. Thus, under favourable conditions, it has been found by experience that it is sufficient to use about 30 grammes of calcium phosphide to each cubic metre, i. e. about 15 hundredweight, of grain. Under less favourable conditions, for example, when the temperature is lower, several times the amount indicated may, however, be employed. In order that quantities of the material which always evolve the same amount of poisonous gas may always be available, it is advisable to employ the calcium phosphide in the form of tablets of standard side.

The new process has the great advantage that, in contradistinction to all the gassing processes hitherto known, it is not necessary to employ gas tight chambers, yet the vermin including their larvae are destroyed with absolute certainty. At the same time, it has unexpectedly been found that the grain itself is not attacked. The grain not only remains palatable but also loses the odour of phosphine with surprising rapidity. With the new process also, no residue whatever remains behind in the grain so that the treated grain can be employed without objection as food for human beings and animals just as fresh grain. The use of the new process necessitates no special technical knowledge whatever so that the new vermin exterminating process can be carried out without employing technical operators, as was necessary when carrying out other known processes, the more so because phosphine always gives a warning of its presence owing to its characteristic odour.

*Example.*—The grain is shovelled into heaps of about ½ metre in height. The calcium phosphide contained in its packing is inserted at a depth of about 25 centimetres into the heaps of grain. In order to obtain a rapid and uniform permeation of the heap of grain by the phosphine, the use of several gassing containers at suitable distances apart within the heap of grain is advisable. After the introduction of the containers, the heaps of grain are covered with a tarpaulin. After eight days, the covering is removed and the containers are taken away. The grain is then preferably subjected to a winnowing treatment in order to remove the dead vermin, such as corn beetles, meal beetles, meal moths, grain capuchins, chapra beetles, maize beetles, rice beetles, larder beetles and other insects, and to eliminate the last traces of any odour of phosphine which may still be adhering to the grain.

As has already been mentioned, the most varied phosphides such as calcium phosphide, barium phosphide, aluminium phosphide, magnesium phosphide and the like can be employed. The most practicable form in which to use the phosphide is, of course, in the form of powder. A powder can not only be easily measured out with a measuring vessel, spoon or filling machine but the properties of a substance are also most uniform when it is in powder form. It has been found, however, that the pulverulent phosphide compounds of calcium, magnesium and barium are not very stable. They give off hydrogen phosphide in the sheet metal boxes which are employed for their carriage or transport and may thereby burst open the boxes. It has also been found by experience that phosphides in the form of lumps or pieces keep better, so that they can be placed on the market in tightly closed sheet metal containers.

Calcium phosphide in the form of lumps or pieces, however has the disadvantage that it can only be measured out into the form of doses with difficulty. Pulverization by the user in a mortar or the like before use is out of the question because the pieces of calcium phosphide are very hard. A further undesirable property of calcium phosphide is that the content of phosphide in the individual pieces varies.

When gasifying the phosphides of calcium, magnesium and barium in the form of lumps, it has been found that the products of decomposition formed during the gasification occupy a considerably greater volume in comparison with the original material and this increase in volume may amount to up to about 30%. Consequently the sheet metal containers which, for example, may be employed for the gassing may in some cases be burst open so that the poisonous material may escape. None of these disadvantages however is possessed by aluminium phosphide which is therefore particularly suitable for use in exterminating vermin especially in small works and when used by laymen.

Aluminium phosphide is a brittle, powdery, sometimes slag-like, porous mass which can be uniformly disintegrated very easily with little pressure and without any strong evolution of phosphine taking place. Aluminium phosphide therefore can very easily be made up into doses. The preparation can be mixed well so that a uniform content of phosphide can be guaranteed. The most important advantage of aluminium phosphide over the phosphides of calcium, magnesium and barium is, however, the excellent stability of the powdered aluminium phosphide in sheet metal containers. When filled into boxes it still remains undecomposed. With powdered aluminium phosphide, the highly dangerous and therefore much feared development of phosphine does not take place during the time when it is stored in the boxes.

In comparison with the other phosphides, aluminium phosphide reacts somewhat more slowly with water or with moisture in the air. Nevertheless it can be decomposed completely and to such an extent that the residue is no longer poisonous. The volume of the residual products is only about 15% greater than that of the undecomposed substance. The increase in volume is therefore only about half that which occurs in the case of the phosphides of calcium, magnesium and barium. Bursting of the gassing containers has therefore not been observed with aluminium phosphide.

The phosphide preparations from calcium, magnesium and barium moreover always contain only about 30% pure phosphide and at the most 60% as production in a concentrated form gives rise to considerable technical difficulties. Aluminium phosphide, on the other hand, can be manufactured in a high degree of purity and with a phosphide content of about 90 to 98% without any special difficulty.

As it is desirable in many cases that the phosphine produced should be easily detected by anybody even when highly diluted, when manufacturing the aluminium phosphide it is easily possible by the addition of sulphur to effect the formation of aluminium sulphide which decomposes in a similar manner to aluminium phosphide with evolution of the pungent hydrogen sulphide. As is well-known, the odour of hydrogen sulphide can be detected considerably more easily than that of phosphine, so those who are unaware can be warned by it in good time of the presence of the phosphine.

An addition of sulphur to a finished phosphide has previously been proposed. This addition, however, was only for the purpose of forming an incrustation on the individual pieces of phosphide in order to obtain thereby certain advantages over the usual phosphide pieces or lumps, which advantages, however, are present from the beginning when aluminium phosphide is used, namely, stability in air, impossibility of self-ignition, granulation of the product and so forth. It was not, however, recognized that the formation of hydrogen sulphide on the decomposition of the sulphide by moisture in the air would give an excellent warning of the presence of phosphine which is far less easily perceptible. Since hydrogen sulphide has almost the same specific gravity as phosphine, the hydrogen sulphide will be similarly distributed in the atmosphere permeated by the phosphine.

In accordance with the invention, the sulphur is added to the aluminium phosphorous mixture before the manufacture. Particular importance is attached to the aluminium sulphide being uniformly distributed in the aluminium phosphide.

Aluminium phosphide therefore has the following advantage over the phosphides of calcium, magnesium and barium:

1. It can be easily converted into powder form and can therefore easily be dispensed in doses.
2. It can be packed and transported easily and without danger.
3. It can easily be delivered with a uniform phosphide content.
4. It is of the highest quality, since even the commercial product has a phosphide content of 90% and more.
5. It is not liable to catch fire because in the presence of moisture only gaseous $PH_3$ is formed and no formation of self-ignitible hydrogen phosphide occurs.
6. When decomposed by moisture there is only a small increase in volume which is not sufficient to burst the gassing container.
7. The residual products from the decomposition are practically non-poisonous.

Having now particularly described and ascertained the nature of our said invention and in what manner the same is to be performed, we declare that what we claim is:

1. The method of exterminating vermin and their larvae in grain consisting in packing a metal phosphide in a gas-pervious packing and inserting the said packing without addition of a reagent into a heap of grain.

2. The method of killing corn beetles and their larvae in grain consisting in wrapping a metal phosphide in a gas-pervious packing, introducing the wrapped phosphide into a heap of grain, covering the grain and allowing the phosphine ($PH_3$) formed in the grain by the reaction of the moisture contained in the grain and the atmosphere with the said metal phosphide to act on the grain for several days.

3. The method according to claim 2 in which calcium phosphide is used as a metal phosphide.

4. The method according to claim 2 in which aluminium phosphide is used as a metal phosphide.

5. The method according to claim 2 in which aluminium phosphide containing aluminium sulphide is used as a metal phosphide.

6. The method of exterminating vermin and their larvae in grain consisting in packing a metal phosphide in a gas-pervious packing, inserting the said packing without addition of a reagent into a heap of grain, covering the grain, taking away the gas-pervious packing with its contents after several days and subjecting the grain to a winnowing treatment to separate the grain from dead vermin.

7. The method of freeing grain from corn beetles, their eggs, larvae, and other vermin, comprising wrapping aluminium phosphide in a gas-pervious packing, inserting such packing without addition of a reagent into a mass of grain, permitting the phosphine ($PH_3$) evolved from the phosphide by the reaction of the latter with the moisture contained in the grain and the atmosphere to act on the grain for several days, taking away such packing and removing the dead vermin from the grain.

WERNER FREYBERG.
WALTER HAUPT.